United States Patent [19]

Cook et al.

[11] Patent Number: 5,256,503
[45] Date of Patent: Oct. 26, 1993

[54] PROCESS FOR MAKING A COMPOSITE MEMBRANE

[75] Inventors: John A. Cook, Oxfordshire; Iain S. Smith, Swindon; Raymond W. Singleton, Gloucestershire, all of United Kingdom

[73] Assignee: Scimat Limited, United Kingdom

[21] Appl. No.: 869,856

[22] PCT Filed: Apr. 6, 1987

[86] PCT No.: PCT/GB87/00237

§ 371 Date: Dec. 3, 1987

§ 102(e) Date: Dec. 3, 1987

[87] PCT Pub. No.: WO87/06395

PCT Pub. Date: Oct. 22, 1987

Related U.S. Application Data

[63] Continuation of Ser. No. 284,749, Dec. 12, 1988, abandoned, which is a continuation of Ser. No. 133,106, Dec. 3, 1987, abandoned.

[30] Foreign Application Priority Data

Apr. 7, 1986 [GB] United Kingdom ............... 8608430

[51] Int. Cl.$^5$ ........................... H01M 2/16; C08D 5/20
[52] U.S. Cl. ........................................ 429/249; 521/27
[58] Field of Search ............................ 429/247–251, 429/254; 204/257, 296; 427/336, 393.5, 244, 430.1; 428/319.7, 341; 521/27, 28

[56] References Cited

U.S. PATENT DOCUMENTS

| Re. 31,824 | 2/1985 | D'Agostino et al. | 429/250 |
|---|---|---|---|
| 2,965,697 | 12/1960 | Duddy | 429/192 |
| 3,376,168 | 4/1968 | Horowitz | 429/251 X |
| 4,230,463 | 10/1980 | Henis et al. | 55/16 |
| 4,346,142 | 8/1982 | Lazear | 428/315.7 |
| 4,468,441 | 8/1984 | D'Agostino et al. | 429/105 |
| 4,547,411 | 10/1985 | Bachot et al. | 427/393.5 |
| 4,613,544 | 9/1986 | Burleigh | 428/315.5 |

FOREIGN PATENT DOCUMENTS

| 160473 | 11/1985 | European Pat. Off. . |
|---|---|---|
| 2432535 | 2/1980 | France . |
| 55-32375 | 3/1980 | Japan . |
| 1039444 | 8/1966 | United Kingdom . |
| 1303897 | 1/1973 | United Kingdom . |
| 1372225 | 10/1974 | United Kingdom . |
| 1449814 | 9/1976 | United Kingdom . |
| 1493654 | 11/1977 | United Kingdom . |
| 1512553 | 6/1978 | United Kingdom . |
| 1538810 | 1/1979 | United Kingdom . |
| 2098628 | 11/1982 | United Kingdom . |

OTHER PUBLICATIONS

Extended Abstracts, vol. 80-2, 1980 (Pennington, New Jersey, USA), W. H. Philipp et al., "New Ion Exchange Membranes" pp. 1537–1538, abstract No. 618.

Chemical Abstracts, vol. 93, No. 6, Sep. 1980 (Columbus, Ohio, USA), p. 498, abstract No. 122614u & JP, A, 8032375 (Sumitomo Chemical) Mar. 7, 1980.

*Primary Examiner*—Anthony Skapars
*Attorney, Agent, or Firm*—Lerner, David, Littenberg, Krumholz & Mentlik

[57] ABSTRACT

A composite membrane comprises a first material which defines a porous matrix and a second material blocking the pores of the matrix, the second material having been crosslinked by irradiation, preferably with UV radiation, when in the pores. Preferably a crosslinking agent is mixed with the second material.

The porous matrix may be made by leaching a water soluble material from a blend of that material with polyethylene. The second material may be polymerizable, for example an acrylic acid derivative.

26 Claims, No Drawings

PROCESS FOR MAKING A COMPOSITE MEMBRANE

This is a continuation of application Ser. No. 07/284,749 filed on Dec. 12, 1988, now abandoned, which is a continuation of application Ser. No. 07/133,106, filed on Dec. 3. 1987, now abandoned, and as described and claimed in International Application PCT/GB87/00237, filed on Apr. 6, 1987.

This invention relates to a process for making a composite membrane and to a composite membrane, which is particularly useful as an ion-exchange membrane for use for example as an electrode separator in certain types of electrochemical device.

In certain types of electrochemical device, in particular of electrochemical cell, lifetime can be limited to migration of electrode material in particulate form and in solution onto the opposing electrode and subsequent self-discharge. Another problem arises in secondary cells on recharging when loosely attached material is deposited on the anode, often in the form of dendrites. These problems can be overcome by use of an electrode separator which provides a continuous barrier to electrode particles and which allows ionic conduction.

U.S. Pat. No. 2,965,697 (Duddy) discloses a battery diaphragm which consists of a porous matrix in which pores are filled with crosslinked polyacrylic acid. The diaphragm is made by impregnating a porous matrix, for example of polyethylene, with a mixture of methacrylic acid, divinyl benzene and benzoyl peroxide, and then applying heat to initiate polymerisation of the acid. The polymerisation reaction is exothermic and once it has been initiated, it is necessary to apply heat moderating means in order to ensure that the rate of reaction is controlled.

The process described in U.S. Pat. No. 2,965,697 is a slow and inconvenient batch process, and requires the use of the above-mentioned heat moderating means. However, even with such apparatus, the process is particularly difficult to control so as to produce diaphragms with consistent properties.

We have devised a convenient process for making a composite membrane which involves the use of irradiation, particularly using ultraviolet (UV) radiation to effect crosslinking of an ion exchange material within the pores of a porous matrix.

Accordingly in a first aspect, the present invention provides a process for making a composite polymer membrane, which comprises irradiating a membrane comprising a first material which defines a porous matrix, and a second material blocking the pores of the matrix which is crosslinkable when the membrane is irradiated as aforesaid.

The process of the invention has the advantage that it can be performed continuously on a continuous strip of the composite membrane, by passing the strip under a source of radiation rather than by exposing a membrane to heat. The sheet may be in the form of a film, tape, or ribbon, or in the form of a tube. Other sheet-like forms may be used depending upon the application. Preferably, the sheet will be flexible. The source of radiation will preferably provide UV radiation which is cheap and convenient to use with small safety risks. It is envisaged however that gamma radiation such as from a $Co^{60}$ source or electron bombardment may be used as alternative radiation sources. An appropriate initiator will generally be mixed with the second material for initiation of the crosslinking reaction, and where necessary for initiation of polymerisation of the second material. When UV radiation is used, a photoinitiator will be mixed with the second material. Suitable photoinitiators are well known in the prior art such as acetophenone, propionphenone, xanthone, fluorenone, 3- or 4-methoxyacetophenone, 2-hydroxy-2-methyl-1-phenylpropan-1-one, 1-(4-isopropylphenyl)-2-hydroxy-2-methylpropan-1-one and 1-hydroxycyclohexylphenyl ketone etc.

Furthermore, the use of irradiation, especially UV irradiation, has the advantage that the crosslinking step is readily controllable, it being possible to control the degree of crosslinking by selecting an appropriate exposure of the membrane to the radiation. Thus it is possible to produce continuous lengths of irradiated membrane with consistent properties, and to ensure that those properties are reproduced in subsequent lengths.

UV radiation has the further advantage that its energy is suitable for effecting the crosslinking of thin films; radiation from other sources with higher energy is absorbed only singly by thin membranes.

A yet further advantage of UV radiation is that it has been found to increase the wettability of a membrane, possibly as a result of ionisation of its surface. This is useful because it can facilitate subsequent reaction of components of the membrane: for example, it can facilitate neutralisation of acrylic acid when used as the second material of the membrane.

The ability to control the degree of crosslinking has been found to lead to an important subsidiary advantage in that fundamental properties of the membrane can conveniently be altered. These include the ionic conductivity through the membrane (when used as a separator in an electrochemical cell) and also the barrier properties of the membrane for example towards dissolved electrode material. Both the barrier properties and the conductivity depend inter alia on the extent to which the membrane swells on contact with a liquid such as the electrolyte of an electrochemical cell, particularly an alkaline electrolyte: a swollen membrane will have a high conductivity but poor barrier properties compared with a relatively less swollen membrane, since liquid electrolyte can more easily be absorbed into the membrane when it is swollen. The degree of swelling is affected by the density of the crosslinks in the second material of the membrane. Thus, simply by altering the crosslink density, it is possible to vary the barrier properties and ionic conductivity of the membrane, such alteration being particularly simple to effect in the method according to the present invention. This allows membranes to be made conveniently to suit the requirements of particular applications. For example in the case of alkaline electrochemical cells the barrier properties required of the membrane are dependent to some extent on the solubility of electrode material in the cell electrolyte. Thus, the present invention enables a separator to be made conveniently for a mercury/mercuric oxide cell that has a higher conductivity than one for a silver/silver oxide cell, which is desirable because of the lower solubility of mercuric oxide in alkaline solution. The present invention therefore enables membranes to be made conveniently to suit each particular application with optimum conductivity.

Preferably, the pores defined by the matrix of the first material are blocked over substantially the entire area of the membrane. It is particularly preferred that the pores be substantially filled with the second material, it being understood that this does not necessitate the exposed surface of the second material in the pores being exactly in line with the main surface of the membrane, and the degree of filling may vary somewhat depending on the shape, size, and tortuosity of the pores. Pores which are much less than completely filled by the second material within them may be suitable for some purposes, provided that the pores remain substantially blocked at some point within their length, in the sense that there is no passage within the pore whereby fluids may readily pass the blocking "plug" without having to permeate the plug and/or the surrounding wall material of the pore.

For optimum barrier properties, it is preferred that at least 20% of the volume of the pores within the matrix of the first polymeric material is filled by the second material, more preferably at least 75%, especially at least 95%.

In a preferred embodiment of this invention, the second material in the pores of the matrix is mixed with a crosslinking agent to effect the crosslinking of the second material. The density of crosslinks can be affected by the proportion of crosslinking agent to second material. Preferably the mole ratio of crosslinking agent to second material is at least 0.1%, more preferably at least 0.5%, especially between 1% and 15%. The need for a crosslinking agent will depend on the particular second material that is selected, and in some cases on the intended end use of the article.

The second material may be selected according to the intended end use of the membrane, polymeric materials (including homo- and copolymers and mixtures thereof) being preferred. Materials which may be used to form a second polymeric material include ethylenically unsaturated acids and their esters for example acrylic acid, methacrylic acid, ethyl acrylate and methylacrylate, maleic acid, maleic anhydride, acrylamide N-monomethyl and N,N-dimethylacrylamide, vinyl acetate, vinyl pyridines for instance 2-vinylpyridine, 2-methyl-5-vinylpyridine and 2-vinyl-5-ethylpyridine. Sulphonation of suitable second materials (e.g. styrene monomer or polymer) for ion exchange purposes may be useful. Polymers or copolymers of ethylenically unsaturated acids are preferred for ionically active sheets such as electrochemical cell electrode separators, acrylic and methacrylic acid polymers of copolymers being especially preferred. In any case, second materials which are polyelectrolytes may be selected to provide the article with an ion-exchange capacity, preferably greater than 1 milliequivalent per gramme (meq.g$^{-1}$), preferably greater than 3 meq.g$^{-1}$ and ideally greater than 5 meq.g$^{-1}$.

The second material can conveniently be supplied to the pores of the matrix of the first material in monomer form and then polymerised in situ when the membrane is irradiated. This is particularly advantageous when the second material is a liquid when monomeric and a solid when polymerised since it enables the pores within the matrix to be filled substantially completely with the polymerised second material simply by impregnation, for example under vacuum, with the liquid monomer.

When the second material is polymerised by irradiation, polymerisation and crosslinking reactions compete for the monomeric second material. By selecting a crosslinking agent with an appropriate reactivity towards the monomeric second material, compared with the reactivity of that material in polymerisation, the density of crosslinks can be adjusted to suit a particular application, as described above.

Surprisingly, it has been found that certain crosslinking agents react with preferred second materials such as acrylic acid derivatives at such at rate as to give crosslink density which renders the crosslinked second material inert to aqueous acid and base; such crosslinking agents generally form a secondary radical (whether conjugated or non-conjugated) or a tertiary non-conjugated radical when irradiated. Such particularly preferred crosslinking agents include triallyl isocyanurate (TALC), triallyl cyanurate (TAC), 1,5-hexadiene-3-ol, 2,5-dimethyl-1,5-hexadiene, 1,5-hexadiene, 1,7-octadiene, 3,7-dimethyl-2,6-octadiene-1-ol (Nerol TM) and the diacrylates such as polyethylene glycol diacrylate and dimethacrylate and triethylene glycol dimethacrylate.

The use of irradiation, particularly UV radiation, enables the process of the present invention to be carried out more quickly and more efficiently than the thermally initiated crosslinking reactions used in prior art processes. Thus the crosslinking reaction can, in favourable circumstances, be completed in less than 30 seconds.

The second material, together with initiator and crosslinking agent when present, may be introduced into the pores of the matrix of the first polymeric material in solution. It is however desirable to use a solution of the second material which polymerises and is crosslinked at an acceptable rate without unacceptable phase separation of the solution. For example, a solution consisting of the following could be used (percentages given by weight):

| | |
|---|---|
| acrylic acid (reactive monomer) | 60 to 95% |
| crosslinking agent | 0.5 to 25% |
| photoinitiator | 0.1 to 5% |
| water | up to about 60% |

The matrix of the first material is preferably formed by removal, preferably by liquid extraction, of a removable material dispersed therein. Liquid extraction of polyethylene oxide from an article comprising a mixture of polyethylene and polyethylene oxide is a preferred example, other possibilities including liquid extraction of solid fillers from sheet comprising the filler and a polymer such as polyethylene, the filler being for example lithium carbonate and the extraction medium being hydrochloric acid; extraction of polyvinylacetate from polyvinylchloride sheet; or extraction of ethylene/vinylacetate copolymer from isotactic polypropylene.

It will be understood that when the term porous is used to describe the matrix of the first material, the term is applicable to a component of a membrane which consists of interpenetrating phases.

The membrane made by the present method preferably has a thickness of less than 250 micrometers, more preferably less than 200 micrometers, and especially less than 150 micrometers. For use as an electrode separator in an electrochemical device such as a cell, it is preferred that the thickness of the membrane is from 25 to 100 micrometers, and it is an advantage of the membrane made by the present method that such a relatively thick barrier without direct open passages through it can be used to resist penetration by, for example, silver oxide in silver-zinc cells, or by dendrite growth, while surprisingly lowering the electrical resistance by as much as 50% compared with much thinner (25 to 30 micrometers) known membranes in which acrylates are merely radiation-grafted onto a substantially non-porous polymer sheet to improve its characteristics. Other known membranes in which acrylic acid is grafted onto the pore surfaces without blocking the pores require a further absorbent layer to resist penetration, the need for which layer is eliminated by the present invention.

The present invention thus allows membranes to be made which are sufficiently thick to provide a barrier in an electrochemical cell. However, the membranes are not so thick that they are inflexible; indeed, the fat that the present method allows the crosslink density in the second material to be controlled also enables the flexibility of the membrane to be optimised.

Extraction methods of forming the matrix of the first polymer are preferred because the pores produced tend to have a higher tortuosity factor (defined as mean path length/article thickness), determined by resistance measurements as known per se, than pores produced by stretching or perforation techniques. Higher tortuosity is thought to be desirable in order to help retain volatile polymerisable materials such as acrylic acids in the pores until polymerisation is effected, tortuosity factors greater than 2, preferably greater than 4, more preferably greater than 6, and even greater than 7 or greater than 8 are therefore desirable. Mean diameter and porosity can be measured by for example, mercury intrusion porosimetry (ASTM-D-2873-70), and the length by electron microscopy.

However made, it is preferred that the matrix of the first material is microporous, such that the details of its structure are discernable only by microscopic examination. It is particularly preferred that the structure of the pores is so fine that discernment thereof is possible only by use of electron microscopy techniques, which can resolve details of structure below 5 micrometers.

Preferably, the volume of the pores is at least 10%, more preferably at least 30% in order to achieve satisfactory conductivity. A pore volume of 80 to 90% is preferred for many applications.

A particularly preferred embodiment of the present process includes the step of forming the membrane by extruding a blend of the first and second materials which can then be irradiated to crosslink the second material. This method of forming the membrane is appropriate to second materials which are stable, in particular non-volatile, at extrusion temperatures. Thus second materials that are polymeric prior to incorporation in the membrane may be incorporated in this way even if they would be for example too volatile when monomeric. The formation of the membrane by this process has the significant advantage that pores in the matrix of the first material are filled and defined by the second material when the matrix itself is formed; it is not necessary first to create the porous matrix and then to fill the pores with the second material.

Appropriate processing aids will be included in the blend of first and second materials for the extrusion, such a plasticising agents. Advantageously, a crosslinking agent that is included in the blend to crosslink the second material may also function as a plasticising agent in the extrusion step.

Preferably, the second material after irradiation is more permeable (i.e. has a faster diffusion rate) than the first polymeric material to selected ions encountered when the membrane is in use; for example when in use as a cell electrode in an alkaline electrochemical cell, the second material will preferably be relatively permeable to hydrogen and/or hydroxide ions. Both the first and second materials should be substantially inert towards fluids encountered by the membrane when in use, although beneficial interactions such as swelling when desired are not excluded. "Inert" as used herein means that the materials are not destroyed, disintegrated or otherwise unacceptably affected by such fluids. The susceptibility of the second material to removal from the membrane made by the present method is believed to be reduced as a result of grafting of the second material on to the matrix of the first material, simultaneously with the crosslinking reaction.

In another aspect, the present invention provides an electrochemical device, such as an electrochemical cell, which comprises an anode, a cathode, a liquid electrolyte, and an electrode separator which is a composite polymer membrane that is made by the method of the invention.

In addition to its use as a separator in an electrochemical cell, the membrane of the present invention may also be used in other applications where ion exchange properties are required. By appropriate selection of second materials, the membrane may be used in biological applications, for example in dialysis.

Specific embodiments of the invention will now be described by way of example, using a porous film made as follows.

Medium density polyethylenes granules (Sclair 8405 TM from Du Pont) and polyethylene oxide (Polyox WSRN 750 TM from Union Carbide) were compounded using a Baker Perkins twin screw extruder to give a blend containing 40 parts of polyethylene and 60 parts by weight polyethylene oxide. The compound was then blown into a 100 micron thick film using conventional blown polymer film techniques. The die gap was 0.65 millimeters and the die temperature 210° C. The blow ratio was 2:1.

The blown film was then immersed in water to remove the polyethylene oxide by dissolution. The film was then removed from the water and dried to leave a microporous web of polyethylene.

Using mercury intrusion porosimetry (ASTM D2873-70) the porosity of the microporous film was found to be 50% and the average pore diameter was 1 micron.

The film was found not to be wetted by water or alkaline electrolytes. Using the method described in "Characteristics of Separators for Alkaline Silver Oxide Secondary Batteries", AD447301 U.S. Air Force Manual, the resistance of the film after 24 hours in 40% ww potassium hydroxide (KOH) at 30° C. was found to be 11.9 ohm.cm$^2$.

EXAMPLE 1

A battery separator was prepared by taking a continuous length of the microporous film (width 10 cm) described above and vacuum impregnating the film with a solution of the following composition (all amounts of percent by weight).

| | |
|---|---|
| Acrylic Acid (supplied by Aldrich) | 63% |
| Triallyl Isocyanurate (Nippon Kasei Chemical Co Ltd) | 5% |
| Daracur 1116 TM (Merck) | 5% |
| Water | 27% |

(1) Daracur 1116 is 1-(4-Isopropylphenyl)-2-hydroxy-2-methylpropane-1-one, a photoiniator.

The percentage mole ratio of the crosslinking agent to acrylic acid was 2.3%.

Care was taken to make sure that all the pores within the film were completely filled with the solution. The impregnated solution was then photopolymerized within the pores by passing the film at a speed of 0.4 meters per minute under a 15.4 cm long 500 watt medium pressure mercury vapour UV lamp (Hanovia Type UVS 500). The distance between the lamp and the microporous film was 6 cm and the total irradiation time for any part of the film was 22 seconds.

The above process of impregnation and UV irradiation was repeated on the previously unexposed side of the film.

After irradiation the treated film was washed in methanol and then water to remove unreacted monomer and photoinitiator. The film was then further treated in 5% w/w KOH at 60° C. for 16 hours to convert the polymerized acrylic acid into its potassium ion form. Finally, the film was washed against with water before being allowed to dry within a constant 50% relative humidity environment.

The separator thus produced was strong and flexible and had a final thickness of 100 micrometers. The moisture content as determined by drying at 100° C. was 15%. Chemical analysis showed the separator contained 43% acrylic acid with respect to its dry acid form. The ion exchange capacity was 6 meq.g$^{-1}$. Table 1 below lists some additional characteristics of the separator. These characteristics were determined according to the methods described in "Characteristics of Separators for Alkaline Silver Oxide Secondary Batteries", AD447301 U.S. Air Force Manual.

TABLE 1

| | |
|---|---|
| Resistance (40% ww KOH at 30° C.) | 0.145 ohm cm$^2$ |
| Electrolyte Diffusion (10 Molar KOH gradient at 25° C.) | 0.21 mmol cm$^{-2}$ min$^{-1}$ |
| Dimensional change (40% KOH at 30° C.) | |
| Length | +6% |
| Width | +15% |
| Thickness | +50% |
| Electrolyte Absorption (40% ww KOH at 30° C.) | 160% |
| Oxidation Resistance (weight loss, Alkaline Permanganate) | 2% |
| Barrier to Ag$_2$O | Very good |

EXAMPLE 2

Additional battery separators of thickness 50 microns and 200 microns were prepared according to the method described in Example 1. The resistance of these separators in 40% ww KOH at 30° C. is given in Table 2.

TABLE 2

| Separator thickness (micrometres) | Resistance (ohm cm$^2$) |
|---|---|
| 50 | 0.085 |
| 200 | 0.220 |

EXAMPLE 3

The long term stability of the battery separator was evaluated by storing pre-weight samples made according to Example 1 in 40% ww KOH at 60° C. for various periods of time. After storage the samples were dried, re-weighed to determine any weight loss and then their resistance in 40% ww KOH at 30° C. determined. The results are shown in Table 3 below and clearly demonstrated the stability of the separator to strong alkaline electrolytes.

TABLE 3

| Storage Time (weeks) | Weight Loss (%) | Resistance (ohm cm$^2$) |
|---|---|---|
| 0 | 0 | 0.145 |
| 2 | 0 | 0.167 |
| 4 | 0.7 | 0.154 |
| 6 | 2.5 | 0.125 |
| 8 | 3.5 | 0.157 |

EXAMPLE 4

This examples demonstrates how the proportion of crosslinking agent to acrylic acid in the impregnation solution can alter the properties of the separator by changing the density of crosslinks.

A battery separator was prepared according to the method described in Example 1 using an impregnation solution of the following composition.

| | |
|---|---|
| Acrylic acid | 68% |
| Triallyl Isocyanurate | 15% |
| Daracur 1116 | 6% |
| Water | 11% |

The percentage mole ratio of the cross-linking agent to acrylic acid was 6.4%

The separator thus produced was strong and flexible and had a final thickness of 110 microns. The moisture content was 15%. The separator contained 35% acrylic acid and had an ion exchange capacity of 4.9 meq.g$^{-1}$. Table 4 below lists some additional characteristics of the separator.

TABLE 4

| | |
|---|---|
| Resistance | 0.830 ohm · cm$^2$ |
| Dimensional Stability | |
| length | +3% |
| width | +5% |
| thickness | +7% |
| Electrolyte Absorption | 81% |
| Oxidation Resistance | 2% |
| Barrier to Ag$_2$O | Very good |

The separator showed a weight loss of only 7% after 8 weeks storage in 40% ww KOH at 60° C.

At comparison of the data in Table 4 and Table 1 (Example 1) clearly shows the effect of increased density of cross-links on separator properties. Of particular note is increased resistance and a reduction in dimensional changes in alkaline electrolyte.

EXAMPLE 5

Battery separators were prepared according to the method described in Example 1 using the cross-linking agents 1,5-hexadiene, 1,5-hexadiene-3-ol and 3,7-dimethyl-2,6-octadiene-1-ol (all supplied by Aldrich Chemical Co. Ltd). The % compositions by weight of the impregnation solutions were as follows:

| | Composition No. | | |
|---|---|---|---|
| | 1 | 2 | 3 |
| Acrylic Acid | 65.5 | 64 | 60.5 |
| 1,5-hexadiene | 9.5 | — | — |

-continued

|  | Composition No. | | |
| --- | --- | --- | --- |
|  | 1 | 2 | 3 |
| 1,5-hexadiene-3-ol | — | 11 | — |
| 3,7-dimethyl-2,6-octadiene-1-ol | — | — | 16.2 |
| Daracur 1116 | 5 | 5 | 4.7 |
| Water | 20 | 20 | 18.6 |

The percentage mole ratio of the cross-linking agent to acrylic acid was 12.5% for all solutions.

The separators thus produced were all strong and flexible and had a final thickness of 90 and 100 micron. Additional properties of the separators are given in Table 5 below.

TABLE 5

|  | Composition No. | | |
| --- | --- | --- | --- |
|  | 1 | 2 | 3 |
| Acrylic Acid Content (%) | 35 | 30 | 27 |
| Resistance (ohm · cm$^2$) | 0.310 | 0.810 | 1.240 |
| Dimensional Stability (%) | | | |
| length | +1.2 | +1.9 | −0.3 |
| width | +12.6 | +7.4 | +0.5 |
| thickness | +72 | +56 | +19 |
| Electrolyte Absorption (%) | +206 | +169 | +132 |

The stability of these separators to 40% ww KOH was determined according to the procedure described in Example 3. The results of these studies are presented below and show that all the cross-linking agents produce separator stable 40% ww KOH even at 100° c.

| Cross-linking Agent | Temperature (0° C.) | Storage Time (Days) | Weight Loss (%) |
| --- | --- | --- | --- |
| 1,5-Hexadiene | 60 | 26 | 3.7 |
|  | 100 | 9 | 18.9 |
| 1,5-Hexadiene-3-ol | 60 | 26 | 3.2 |
|  | 100 | 9 | 2.1 |
| 3,7-dimethyl-2,6-octadiene-1-ol | 60 | 26 | 4.9 |
|  | 100 | 9 | 15.1 |

EXAMPLE 6

Battery separators were prepared according to the method described in Example 1 except the crosslinking agent triallyl isocyanurate was replaced by either triallyl cyanurate (Nippon Kasei Chemical Co Ltd) or polyethylene glycol 200 diacrylate (Sartomer product SR259 TM). The stability of these separators to alkaline electrolyte was determined according to the procedure described in Example 3. The result of these studies are presented in Table 4 below and show that both cross-linking agents are unsuitable for use with alkaline electrolyte.

TABLE 6

| Crosslinking Agent | Storage Time (Days) | Weight Loss (%) | Resistance (ohm cm$^2$) |
| --- | --- | --- | --- |
| Triallyl Cyanurate | 0 | 0 | 0.157 |
|  | 1 | 44.7 | 1.38 |
|  | 2 | 46.2 | 1.45 |
| Polyethylene glycol 200 diacrylate | 0 | 0 | 0.123 |
|  | 4 | 60 | 15.5 |

EXAMPLE 7

The resistance and stability of the separator materials described in Examples 1, 4, 5 and 6 were evaluated in 28% ww sulphuric acid ($H_2SO_4$). All the separators were found to be stable in the acid with resistance of about 3 ohm cm$^2$.

COMPARATIVE EXAMPLE

Using the microporous film described above, a battery separator was prepared according to the method given in U.S. Pat. No. 2,965,697. The polymerisation reaction was carried out using the heated platen technique and took 20 minutes to complete. The impregnation solution had the following composition (percentage by weight).

| Benzoyl Peroxide (Aldrich Chemical Co Ltd) | 3.4% |
| --- | --- |
| Acrylic Acid | 85.7% |
| Triallyl Isocyanurate | 10.9% |

The percentage mole ratio of the crosslinking agent to acrylic acid was 3.7%.

The separator thus produced was strong but rigid. It had a thickness of 105 micron and a moisture content of 15.6%. Analysis showed the separator contained 51% acrylic acid. The ion exchange capacity was 7.1 meq.g$^{-1}$. The separator resistance was 4.83 ohm.cm$^2$, which was too high to make it of any practical use in an alkaline cell.

For comparison, a battery separator was prepared according to the method of the present invention using an impregnation solution with the same percentage mole ratio of crosslinking agent to acrylic acid as that described above. The separator thus produced was strong and flexible with a thickness of 90 micron. Its moisture content was 15.6% and it contained 43% acrylic acid. The ion exchange capacity was 6.0 meq.g$^{-1}$. The separator resistance was 0.850 ohm.cm$^2$ making it suitable for use in alkaline cells.

We claim:

1. A process for making a composite polymer membrane, which comprises:
   (a) providing a membrane comprising a first polymeric material which defines a microporous matrix and a second material which includes a photoinitiator and which at least partially fills, and thereby blocks, the pores of the matrix; and
   (b) exposing a surface of said membrane to ultraviolet radiation and polymerizing and crosslinking said second material, said membrane having a thickness of no more than about 250 micrometers.

2. A process as claimed in claim 1, in which the second material is mixed with a crosslinking agent.

3. A process as claimed in claim 2, in which the mole ratio of crosslinking agent to the second material is at least 0.1%.

4. A process as claimed in claim 2, in which the crosslinking agent forms a secondary radical or a tertiary non-conjugated radical when the membrane is irradiated.

5. A process as claimed in claim 1, in which the second material comprises an ethylenically unsaturated acid or an ester thereof.

6. A process as claimed in claim 1, in which the second material and the conditions under which it is irradiated are selected to provide the membrane with an ion exchange capacity of greater than 1 milliequivalent per gram.

7. A process as claimed in claim 1, which includes the step of forming a porous matrix of the first polymeric material by removal of a pore forming material.

8. A process as claimed in claim 6, in which the first polymeric material is polyethylene and the porous matrix is formed by liquid extraction of polyethylene oxide dispersed therein.

9. An electrochemical device which comprises an anode, a cathode, a liquid electrolyte, and an electrode separator which is a composite polymer membrane that is made by the process claimed in claim 1.

10. A process as claimed in claim 1, in which at least about 75% of the volume of the pores within the matrix of the first polymeric material is filled by the second material.

11. A process as claimed in claim 10, in which at least about 95% of the volume of the pores within the matrix of the first polymeric material is filled by the second material.

12. A process as claimed in claim 1, in which said surface of said membrane is exposed to ultraviolet radiation, said membrane having a thickness of from about 25 to about 100 micrometers.

13. A process as claimed in claim 1, in which the first material comprises polyethylene.

14. A process for making a composite polymer membrane, which comprises:
  (a) forming a membrane from a blend of two polymeric materials, the first material defining a microporous matrix and the second material including a photoinitiator and at least partially filling, and thereby blocking, the pores of the matrix; and
  (b) exposing a surface of said membrane to ultraviolet radiation and crosslinking said second material, said membrane having a thickness of no more than about 250 micrometers.

15. A process as claimed in claim 14, in which the second material is mixed with a crosslinking agent.

16. A process as claimed in claim 15, in which the mole ratio of crosslinking agent to the second material is at least 0.1%.

17. A process as claimed in claim 15, in which the crosslinking agent forms a secondary radical or a tertiary non-conjugated radical when the membrane is irradiated.

18. A process as claimed in claim 14, in which the second material comprises a polymer of an ethylenically unsaturated acid or an ester thereof.

19. A process as claimed in claim 14, the second material is impregnated in the pores of the matrix of the first polymeric material while in solution.

20. An electrochemical device which comprises an anode, a cathode, a liquid electrolyte, and an electrode separator which is a composite polymer membrane that is made by the process claimed in claim 14.

21. A process as claimed in claim 14, in which the membrane is formed by melt-processing a blend of the first and second materials.

22. A process as claimed in claim 21, in which the membrane is formed by extrusion.

23. A process as claimed in claim 14, in which at least about 75% of the volume of the pores within the matrix of the first polymeric material is filled by the second material.

24. A process as claimed in claim 23, in which at least about 95% of the volume of the pores within the matrix of the first polymeric material is filled by the second material.

25. A process as claimed in claim 14 in which said surface of said membrane is exposed to ultraviolet radiation, said membrane having a thickness of from about 25 to about 100 micrometers.

26. A process as claimed in claim 14, in which the first material comprises polyethylene.

* * * * *

UNITED STATES PATENT AND TRADEMARK OFFICE
CERTIFICATE OF CORRECTION

PATENT NO. : 5,256,503
DATED : October 26, 1993
INVENTOR(S) : Cook et al.

It is certified that error appears in the above-indentified patent and that said Letters Patent is hereby corrected as shown below:

On the title page,

[75] Inventors: "Iain S. Smith, Swindon" should read --Iain S. Smith, Roffshire, Scotland--.
Column 2, line 21, delete "singly" and insert therefor --slightly--.
Column 4, line 10, delete "(TALC)" and insert therefor --(TAIC)--.
Column 5, line 9, delete "fat" and insert therefor --fact--.
Column 5, line 57, after "such" delete "a", and insert therefor --as--.
Column 6, line 27, "polyethylenes" should read --polyethylene--.
Column 8, lines 2-3, "demonstrated" should read --demonstrate--.
Column 9, line 13, after "90" delete "and" and insert therefor --to--.
Column 11, line 1, delete "6" and insert therefor --7--.

Signed and Sealed this

Seventh Day of February, 1995

Attest:

BRUCE LEHMAN

*Attesting Officer*  *Commissioner of Patents and Trademarks*